(12) United States Patent
Banjouya

(10) Patent No.: US 12,443,076 B2
(45) Date of Patent: Oct. 14, 2025

(54) LIQUID CRYSTAL DISPLAY PANEL, LIQUID CRYSTAL DISPLAY DEVICE, AND MANUFACTURING METHOD FOR LIQUID CRYSTAL DISPLAY DEVICE

(71) Applicant: Shanghai Tianma Micro-Electronics Co., Ltd., Shanghai (CN)

(72) Inventor: Akira Banjouya, Kanagawa (JP)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 47 days.

(21) Appl. No.: 18/073,198

(22) Filed: Dec. 1, 2022

(65) Prior Publication Data
US 2023/0205018 A1 Jun. 29, 2023

(30) Foreign Application Priority Data
Dec. 28, 2021 (JP) .................. 2021-213855

(51) Int. Cl.
*G02F 1/1339* (2006.01)
*G02F 1/1333* (2006.01)
*G02F 1/13357* (2006.01)

(52) U.S. Cl.
CPC ...... *G02F 1/1339* (2013.01); *G02F 1/133302* (2021.01); *G02F 1/133331* (2021.01); *G02F 1/133354* (2021.01); *G02F 1/133602* (2013.01)

(58) Field of Classification Search
CPC ............. G02F 1/133331; G02F 1/1339; G02F 1/1341; G02F 1/1347;
(Continued)

(56) References Cited

U.S. PATENT DOCUMENTS

2002/0027636 A1* 3/2002 Yamada ............... G02F 1/13394
349/155
2009/0201443 A1* 8/2009 Sasaki ..................... B32B 17/10
349/160

(Continued)

FOREIGN PATENT DOCUMENTS

JP    2009-42565 A    2/2009
JP    2009-168904 A   7/2009
(Continued)

OTHER PUBLICATIONS

Office Action dated Sep. 9, 2025, issued for the corresponding JP patent application No. 2021-213855.

*Primary Examiner* — Jia X Pan
(74) *Attorney, Agent, or Firm* — Sughrue Mion, PLLC

(57) ABSTRACT

A liquid crystal display panel includes a first substrate curved in a first direction, a second substrate curved in the first direction and facing the first substrate, a liquid crystal sandwiched between the first substrate and the second substrate, and a seal that adheres the first substrate and the second substrate to each other, and that seals the liquid crystal. When cross-sectionally viewing on a cross-section including the first direction and a display direction, a curved surface conforming to first main surface of the first substrate facing the second substrate includes at least one inflection point in a region surrounded by the seal, and tangent planes of the curved surface at each inner peripheral end of the seal are parallel to each other.

10 Claims, 13 Drawing Sheets

(58) Field of Classification Search
CPC ...... G02F 1/13471–13478; G02F 2001/13478; G02F 1/133354; G02F 1/133305; G09F 9/301; G06F 1/1652; G06F 2203/04102
See application file for complete search history.

(56) References Cited

U.S. PATENT DOCUMENTS

| | | | |
|---|---|---|---|
| 2015/0145755 A1* | 5/2015 | Yamazaki | H10K 59/12 |
| | | | 361/679.01 |
| 2015/0211707 A1* | 7/2015 | Watanabe | F21V 5/04 |
| | | | 362/330 |
| 2016/0334834 A1 | 11/2016 | Huang et al. | |
| 2018/0235091 A1* | 8/2018 | Kim | H05K 5/0086 |
| 2019/0018275 A1 | 1/2019 | Ochi et al. | |
| 2021/0003873 A1* | 1/2021 | Kitazumi | G02F 1/133382 |

FOREIGN PATENT DOCUMENTS

| | | |
|---|---|---|
| JP | 5586541 B2 | 9/2014 |
| JP | 2019-020444 A | 2/2019 |
| KR | 10-1113734 B1 | 2/2012 |

* cited by examiner

LIQUID CRYSTAL DISPLAY PANEL, LIQUID CRYSTAL DISPLAY DEVICE, AND MANUFACTURING METHOD FOR LIQUID CRYSTAL DISPLAY DEVICE

CROSS-REFERENCE TO RELATED APPLICATION

This application claims the benefit of Japanese Patent Application No. 2021-213855, filed on Dec. 28, 2021, the entire disclosure of which is incorporated by reference herein.

FIELD

The present disclosure relates generally to a liquid crystal display panel, a liquid crystal display device, and a manufacturing method for the liquid crystal display device.

BACKGROUND

There is a demand for a display device that has a shape corresponding to the installation location, the design of the device on which the display device is to be mounted, and the like. A liquid crystal display device having a curved display surface has been developed as a display device that has a shape corresponding to the design of the device, the installation location, and the like. For example, Japanese Patent No. 5586541 describes a liquid crystal panel in which the curvature of the four corner portions is less than the curvature of other regions other than the four corner portions.

In Japanese Patent No. 5586541, light leakage at the four corner portions of the display region can be reduced as a result of configuring the curvature of the four corner portions of the curved liquid crystal panel to be less than the curvature of the other regions other than the four corner portions. However, when curving a liquid crystal panel, stress is applied to the substrate (the TFT circuit substrate and the color filter substrate) and, consequently, spacing between the substrates near a seal material provided along the sides that are not curved (non-curved sides) may fluctuate. When such a case occurs, display inconsistencies occur along the seal material provided on the non-curved sides. The liquid crystal panel of Japanese Patent No. 5586541 merely reduces the light leakage at the four corner portions, and cannot sufficiently suppress display inconsistencies along the seal material.

SUMMARY

A liquid crystal display panel according to a first aspect of the present disclosure includes:
a first substrate curved in a first direction;
a second substrate curved in the first direction and facing the first substrate;
a liquid crystal sandwiched between the first substrate and the second substrate; and
a seal that adheres the first substrate and the second substrate to each other, and that seals the liquid crystal, wherein
when cross-sectionally viewing on a cross-section including the first direction and a display direction,
a curved surface conforming to first main surface of the first substrate facing the second substrate includes at least one inflection point in a region surrounded by the seal, and tangent planes of the curved surface at each inner peripheral end of the seal are parallel to each other.

A liquid crystal display device according to a second aspect includes:
the liquid crystal display panel according to the first aspect; and
a cover that is provided on a display surface of the liquid crystal display panel or a surface of a side opposite the display surface of the liquid crystal display panel, and supports the liquid crystal display panel in a curved state via an adhesive layer.

A manufacturing method for a liquid crystal display device according to a third aspect includes:
forming, on one of a first substrate and a second substrate, a seal that seals a liquid crystal;
stacking one of the first substrate and the second substrate on which the seal is formed on another of the first substrate and the second substrate;
curing the seal and adhering the first substrate and the second substrate to each other; and
curving the first substrate and the second substrate that are adhered to each other to in a first direction, wherein
in the curving, the first substrate and the second substrate are caused to curve to a state in which, when cross-sectionally viewing on a cross-section including the first direction and a display direction, a curved surface conforming to first main surface of the first substrate facing the second substrate includes at least one inflection point in a region surrounded by the seal, and tangent planes of the curved surface at each inner peripheral end of the seal are parallel to each other.

It is to be understood that both the foregoing general description and the following detailed description are exemplary and explanatory and are not restrictive of this disclosure.

BRIEF DESCRIPTION OF THE DRAWINGS

A more complete understanding of this application can be obtained when the following detailed description is considered in conjunction with the following drawings, in which.

DETAILED DESCRIPTION

Hereinafter, a liquid crystal display panel and a liquid crystal display device according to various embodiments are described while referencing the drawings.

Embodiment 1

Figure 1:
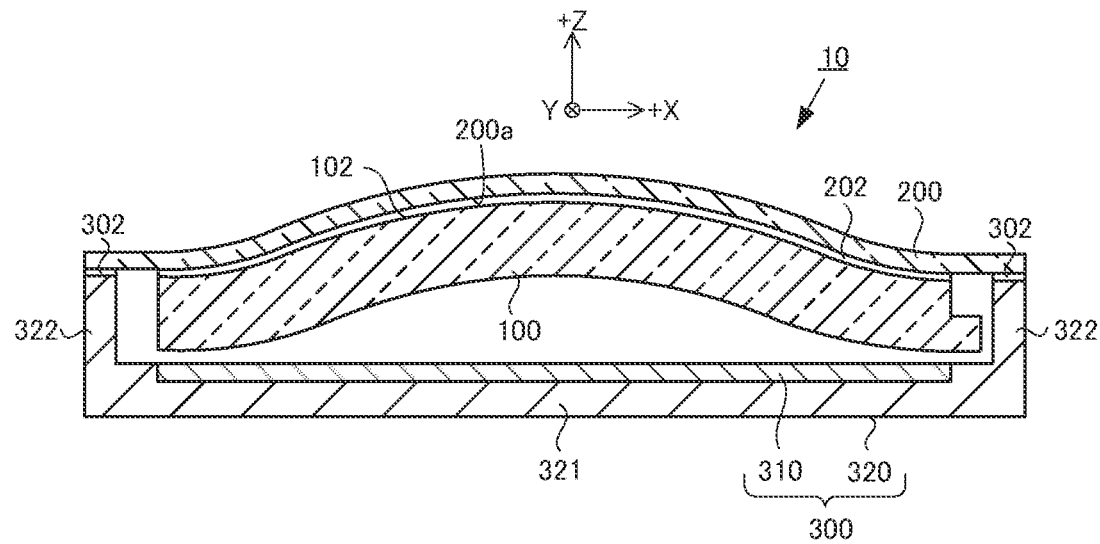
FIG. 1 is a schematic drawing illustrating a cross-section of a liquid crystal display device according to Embodiment 1.

A liquid crystal display device 10 and a liquid crystal display panel 100 according to the present embodiment are described while referencing FIGS. 1 to 6. As illustrated in FIG. 1, the liquid crystal display device 10 includes the liquid crystal display panel 100, a cover 200, and a back light 300. The liquid crystal display panel 100 is a transmissive liquid crystal display panel that includes a curved display surface 102 (surface of a side of a second polarizing plate 150, described later, opposite a second substrate 120). The liquid crystal display panel 100 displays characters, color images, and the like on the basis of signals from a non-illustrated display controller and drive circuit. The cover 200 supports the liquid crystal display panel 100 in a curved state via an adhesive layer 202. The back light 300 emits light at the liquid crystal display panel 100, thereby functioning as a light source of the liquid crystal display panel 100. In the present specification, to facilitate comprehension, a description is given in which, in FIG. 1, the right direction (the right direction on paper) of the liquid crystal display device 10 is referred to as the "+X direction", the up direction (the up direction on paper) is referred to as the "+Z direction", and the direction perpendicular to the +X direction and the +Z direction (the depth direction on paper) is referred to as the "+Y direction." Additionally, the +Z direction is a display direction in which the liquid crystal display panel 100 displays the characters, color images, and the like. Note that, in FIG. 1, to facilitate comprehension, the liquid crystal display panel 100 is illustrated in a simplified manner. Additionally, the hatching of adhesive layers 202 and 302 is omitted from FIG. 1.

The liquid crystal display device 10 is mounted in a vehicle or on an electronic device. Additionally, the liquid crystal display device 10 is used as a signage display.

Figure 2:
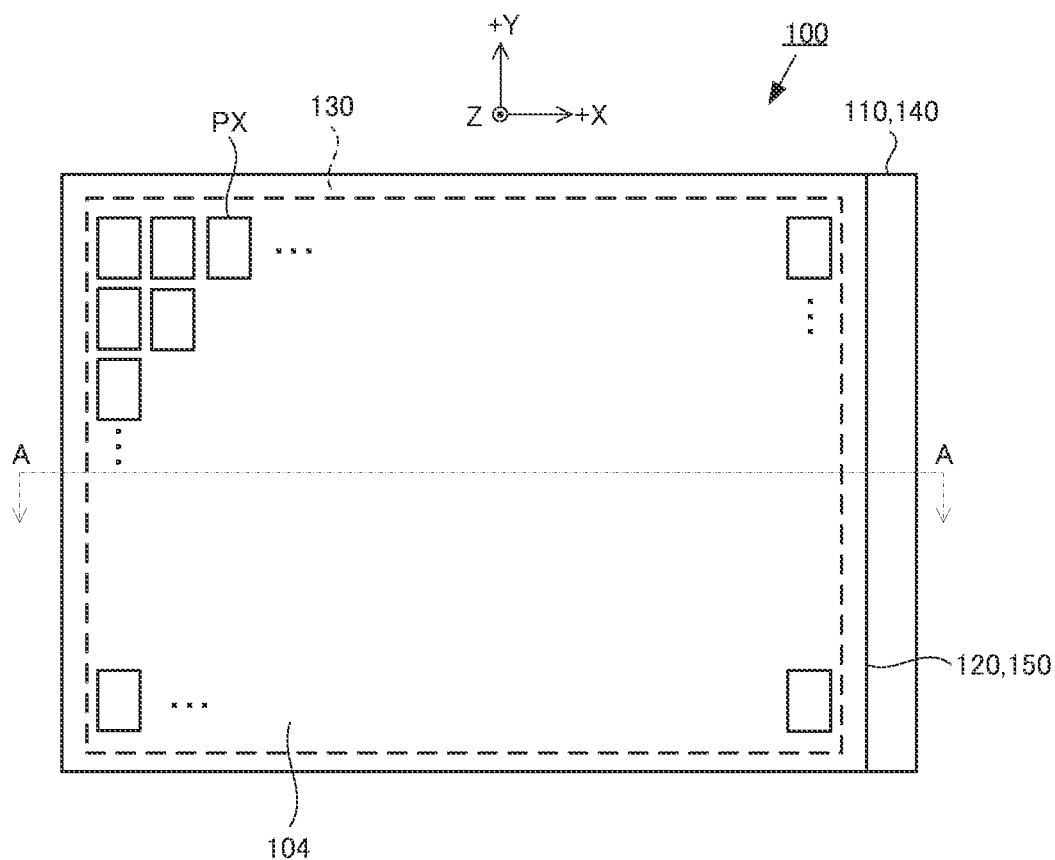
FIG. 2 is a plan view of a liquid crystal display panel according to Embodiment 1.

In one example, the liquid crystal display panel 100 of the liquid crystal display device 10 is implemented as a liquid crystal display panel that is driven by a thin film transistor (TFT). In one example, the liquid crystal display panel 100 operates on the basis of the transverse electric field method. As illustrated in FIG. 2, the liquid crystal display panel 100 includes a display region 104 that is surrounded by a seal 130 (described later). Pixels PX are arranged in a matrix in the display region 104. Moreover, as illustrated in FIG. 1, the liquid crystal display panel 100 curves in the X direction. In the present specification, the X direction corresponds to a first direction. The curving of the liquid crystal display panel 100 is described later.

Figure 3:
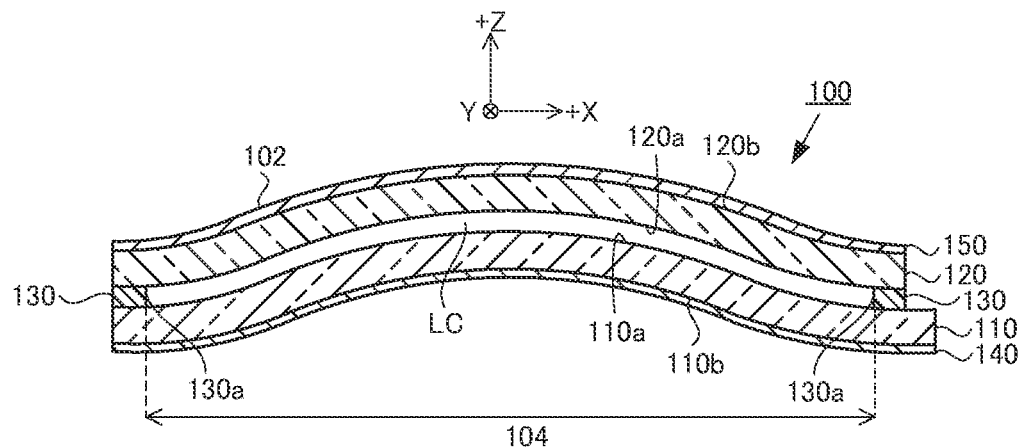
FIG. 3 is a cross-sectional view of the liquid crystal display panel illustrated in FIG. 2, taken along line A-A.

As illustrated in FIGS. 2 and 3, the liquid crystal display panel 100 includes a first substrate 110, a second substrate 120, a liquid crystal LC, and a seal 130. Additionally, the liquid crystal display panel 100 includes a first polarizing plate 140 and a second polarizing plate 150. The first substrate 110 and the second substrate 120 sandwich the liquid crystal LC. The seal 130 adheres the first substrate 110 and the second substrate 120 to each other and seals the liquid crystal LC. The first polarizing plate 140 is adhered to the first substrate 110 and the second polarizing plate 150 is adhered to the second substrate 120. Note that, to facilitate comprehension, the hatching of the liquid crystal LC is omitted from FIG. 3.

In one example, the first substrate 110 of the liquid crystal display panel 100 is implemented as a glass substrate. The first substrate 110 includes a first main surface 110a and a second main surface 110b on the side opposite the first main surface 110a As illustrated in FIG. 3, the first substrate 110 has a uniform thickness. The first substrate 110 is curved in the X direction (first direction). The first substrate 110 includes, on the first main surface 110a facing the second substrate 120, a TFT, wirings, electrodes, an alignment film, and the like (all not illustrated in the drawings). The first polarizing plate 140 is adhered to the second main surface 110b of the first substrate 110.

As with the first substrate 110, the second substrate 120 of the liquid crystal display panel 100 is implemented as a glass substrate. The second substrate 120 also has a uniform thickness. The second substrate 120 also is curved in the X direction (the first direction). The second substrate 120 includes a first main surface 120a and a second main surface 120b on the side opposite the first main surface 120a. The second substrate 120 includes, on the first main surface 120a facing the first substrate 110, a stripe-like color filter, a black matrix, an alignment film, and the like (all not illustrated in the drawings). The second polarizing plate 150 is adhered to the second main surface 120b of the second substrate 120.

The first substrate 110 and the second substrate 120 are adhered to each other, at a predetermined spacing (that is, a predetermined gap), by the seal 130, with a non-illustrated spacer disposed therebetween. The first substrate 110 and the second substrate 120 are adhered to each other such that the first main surface 110a of the first substrate 110 and the first main surface 120a of the second substrate 120 are parallel to each other.

The liquid crystal LC of the liquid crystal display panel 100 is sandwiched between the first substrate 110 and the second substrate 120. The liquid crystal LC is implemented as a nematic liquid crystal.

The seal 130 of the liquid crystal display panel 100 is provided between the first substrate 110 and the second substrate 120, and adheres the first substrate 110 and the second substrate 120 to each other. Additionally, the seal 130 seals the liquid crystal LC between the first substrate 110 and the second substrate 120.

As illustrated in FIG. 2, the seal 130 has a frame-like shape. The seal 130 is formed along the external shapes of the first substrate 110 and the second substrate 120. Additionally, the seal 130 surrounds the display region 104. In one example, the seal 130 is formed from an ultraviolet (UV) curable adhesive.

As illustrated in FIG. 3, the first polarizing plate 140 of the liquid crystal display panel 100 is adhered to the second main surface 110b of the first substrate 110. The second polarizing plate 150 of the liquid crystal display panel 100 is adhered to the second main surface 120b of the second substrate 120. The second polarizing plate 150 is adhered to the cover 200 via an adhesive layer 202. In the present embodiment, the surface of the second polarizing plate 150 on the side opposite the second substrate 120 corresponds to the display surface 102 of the liquid crystal display panel 100.

Figure 4:
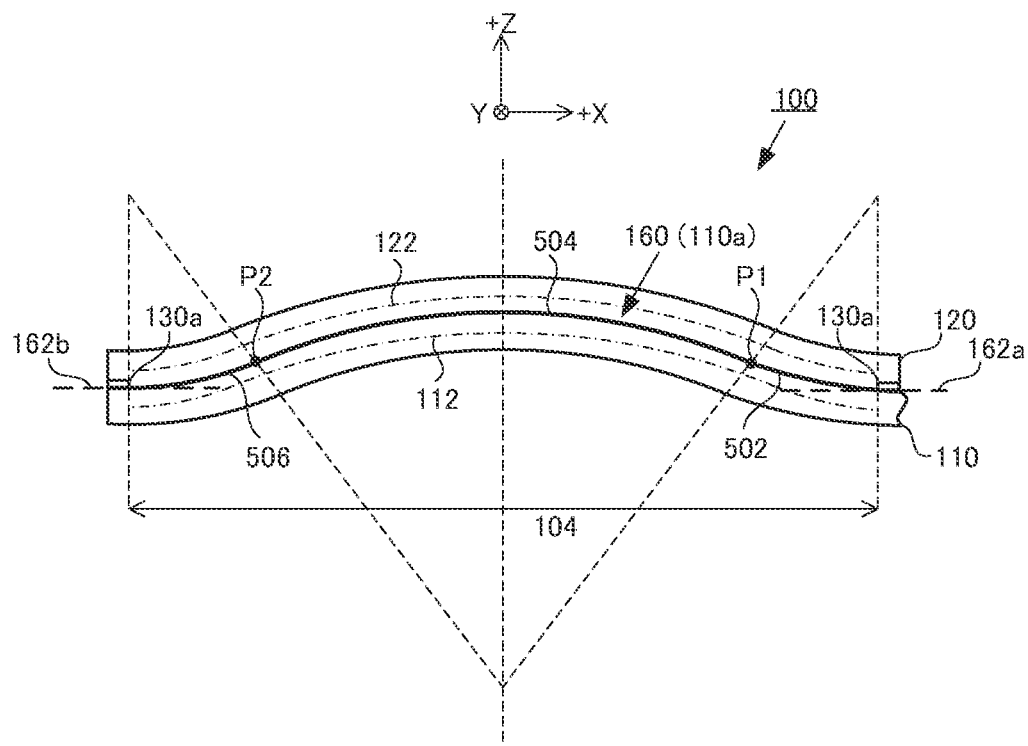
FIG. 4 is a schematic drawing for explaining curving of the liquid crystal display panel according to Embodiment 1.
Figure 5:
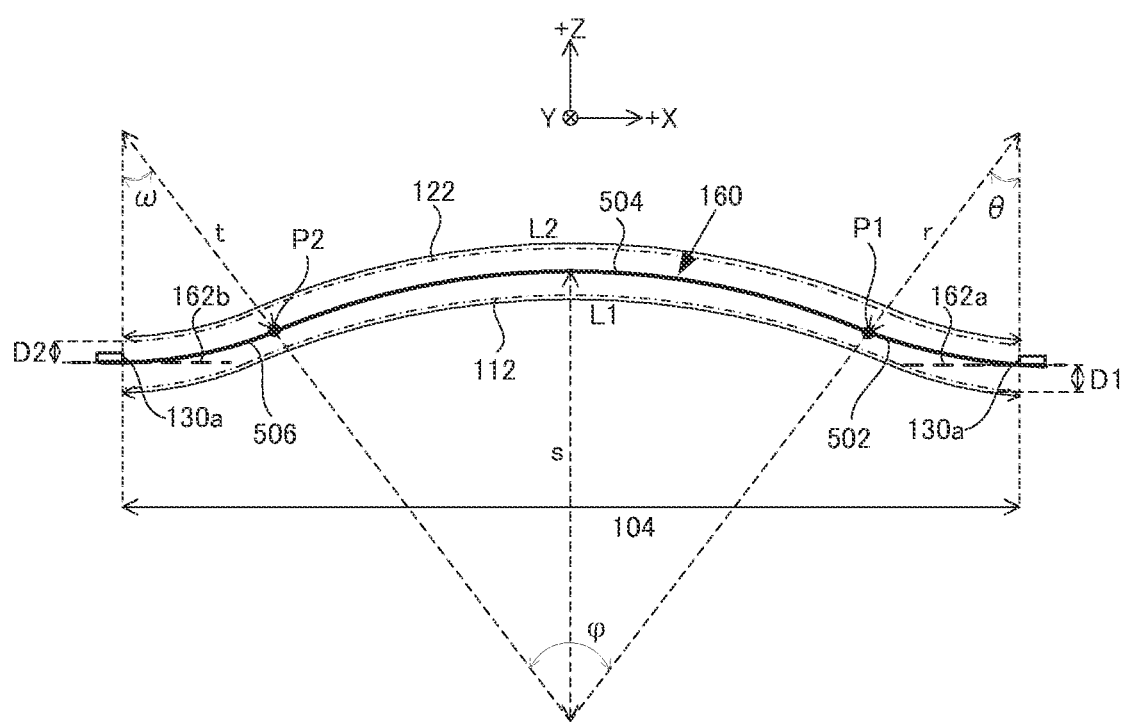
FIG. 5 is a schematic drawing for explaining a length of a center line of a thickness direction of a first substrate and a second substrate according to Embodiment 1.

Next, the curving of the liquid crystal display panel 100 is described while referencing FIGS. 4 and 5. As illustrated in FIG. 4, when viewing the liquid crystal display panel 100 cross-sectionally on a cross-section (XZ cross-section) including the X direction (that is, the first direction) and the Z direction (that is, the display direction), a curved surface 160 conforming to the first main surface 110a of the first substrate 110 has two inflection points P1 and P2 in the display region 104 surrounded by the seal 130, and is curved such that tangent planes 162a and 162b of the curved surface 160 at respective inner peripheral ends 130a of the seal 130 are parallel to each other. Note that, to facilitate comprehension, the liquid crystal LC, the first polarizing plate 140, and the like are omitted, and the liquid crystal display panel 100 is illustrated in a simplified manner in FIG. 4. Additionally, the curved surface 160 may be the first main surface 110a of the first substrate 110 and, in the present embodiment, the first main surface 110a of the first substrate 110 is the curved surface 160. Since the first main surface 110a of the first substrate 110 and the first main surface 120a of the second substrate 120 are parallel, the curved surface 160 may be the first main surface 120a of the second substrate 120. Furthermore, the display surface 102 has the same shape as the curved surface 160.

Specifically, when viewing cross-sectionally on an XZ cross-section, the curved surface 160 curves to the +Z direction in a center section, curves in the −Z direction at the +X-side end and the −X-side end, and has line symmetry with respect to the Z direction. The inflection point P1 is formed at the boundary between a curving surface (concave surface) 502 of the +X-side end and a curving surface (convex surface) 504 of the center section, and the inflection point P2 is formed at a boundary between the curving surface 504 of the center section and a curving surface (concave surface) 506 of −X-side end. Additionally, a tangent plane 162a of the curved surface 160 at an inner peripheral end 130a of the seal 130 positioned on the +X side and a tangent plane 162b of the curved surface 160 at an inner peripheral end 130a of the seal 130 positioned on the −X side are in a parallel state. Due to this configuration, as described later, a length L1 of a center line 112 of the thickness direction of the first substrate 110 in the display region 104, and a length L2 of a center line 122 of the thickness direction of the second substrate 120 in the display region 104 are equal. As a result, the difference between the stress applied to the first substrate 110 and the stress applied to the second substrate 120 is mitigated and, as such, it is possible to suppress the fluctuation of the spacing between the first substrate 110 and the second substrate 120 at the ends (near the inner peripheral ends 130a of the seal 130 positioned on the +X side and the −X side) of the display region 104, and it is possible to suppress display inconsistencies. Note that, in the present embodiment, the tangent planes 162a and 162b are parallel to the XY plane. Additionally, in the present specification, surfaces curved in the +Z direction are convex surfaces, and surfaces curved in the −Z direction are concave surfaces.

Next, the length L1 of the center line 112 of the thickness direction of the first substrate 110, and the length L2 of the center line 122 of the thickness direction of the second substrate 120 are described. For example, as illustrated in FIG. 5, when, in the curved surface 160, a curvature radius and a center angle of the curving surface 502 of the +X side end are r and θ, a curvature radius and a center angle of the curving surface 504 of the center section are s and φ, a curvature radius and a center angle of the curving surface 506 of the −X side end are t and ω, half the thickness of the first substrate 110 is D1, and half the thickness of the second substrate 120 is D2, the length L1 of the center line 112 and the length L2 of the center line 122 are expressed by equations (1) and (2) below. Additionally, based on equations (1) and (2), the difference between the length L1 of the center line 112 and the length L2 of the center line 122 is expressed by equation (3) below.

$$L1 = \frac{2 \times \pi}{360} \times ((r+D1) \times \theta + (s-D1) \times \varphi + (t+D1) \times \omega) \quad (1)$$

$$L2 = \frac{2 \times \pi}{360} \times ((r-D2) \times \theta + (s+D2) \times \varphi + (t-D2) \times \omega) \quad (2)$$

$$L1 - L2 = 2 \times \pi \times (D1+D2) \times \frac{\theta - \varphi + \omega}{360} \quad (3)$$

When the tangent plane 162a of the curved surface 160 at the inner peripheral end 130a of the seal 130 positioned on the +X side and the tangent plane 162b of the curved surface 160 at the inner peripheral end 130a of the seal 130 positioned on the −X side are in a parallel state, θ+ω=φ and, as such, according to equation (3), the length L1 of the center line 112 and the length L2 of the center line 122 are equal. Accordingly, when cross-sectionally viewing on an XZ cross-section, the length L1 of the center line 112 and the length L2 of the center line 122 can be made equal by providing the curved surface 160 with the two inflection points P1 and P2 in the display region 104 and configuring the tangent planes 162a and 162b of the curved surface 160 at the inner peripheral ends 130a of the seal 130 so as to be in a parallel state. As a result, it is possible to suppress the fluctuation of the spacing between the first substrate 110 and the second substrate 120 at the ends of the display region 104, and it is possible to suppress display inconsistencies.

Returning to FIG. 1, the cover 200 of the liquid crystal display device 10 is provided on the display surface 102 side of the liquid crystal display panel 100, and supports the liquid crystal display panel 100 in a curved state via the adhesive layer 202. A main surface 200a, facing the display surface 102, of the cover 200 is molded into a curved surface that matches the curved display surface 102 of the liquid crystal display panel 100. The ends of the cover 200 are fixed to a housing 320 of the back light 300 (described later). In one example, the cover 200 is formed from a light-transmitting resin.

The adhesive layer 202 of the liquid crystal display device 10 is provided on the main surface 200a of the cover 200. The adhesive layer 202 adheres the liquid crystal display panel 100 to the main surface 200a of the cover 200. In one example, the adhesive layer 202 is implemented as an optical clear adhesive (OCA).

The back light 300 of the liquid crystal display device 10 is the light source of the liquid crystal display panel 100. The back light 300 includes a light source 310 and a housing 320.

The light source 310 of the back light 300 is positioned on the −Z side of the liquid crystal display panel 100 and emits light at the liquid crystal display panel 100. In the present embodiment, the light source 310 is embedded in a bottom plate 321 of the housing 320. The light source 310 includes a non-illustrated white light emitting diode (LED), a reflective sheet, a diffusion sheet, and the like (all not illustrated in the drawings).

The housing 320 of the back light 300 has a box shape, and houses the light source 310. Ends of the cover 200 are adhered to upper surfaces of side walls 322 of the housing 320 via the adhesive layer 302.

Figure 6:
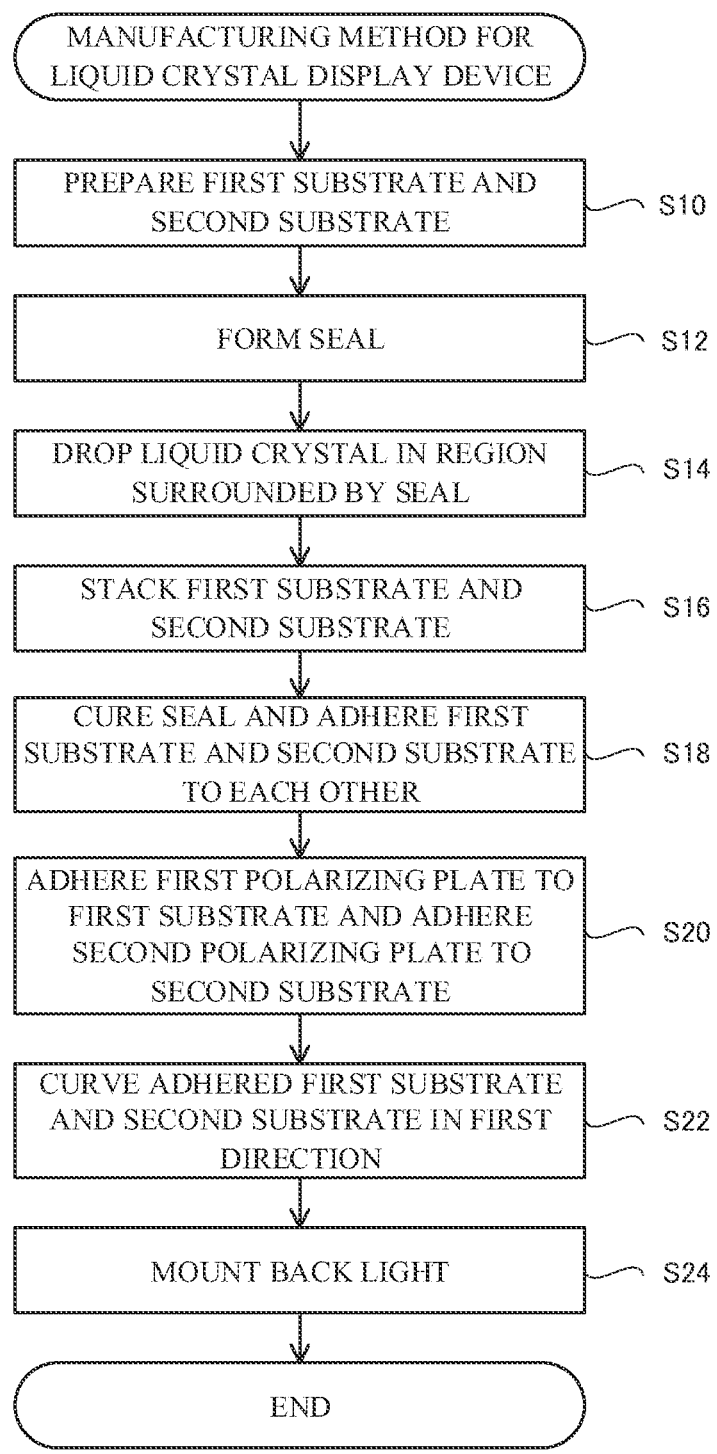
FIG. 6 is a flowchart illustrating a manufacturing method for the liquid crystal display device according to Embodiment 1.

Next, a manufacturing method for the liquid crystal display device 10 is described. FIG. 6 is a flowchart illustrating the manufacturing method for the liquid crystal display device 10. The manufacturing method for the liquid crystal display device 10 includes a preparing the first substrate 110 and the second substrate 120 (step S10); forming, on one of the first substrate 110 and the second substrate 120, the seal 130 that seals the liquid crystal LC (step S12); dropping the liquid crystal LC in the region surrounded by the seal 130 (step S14); stacking one of the first substrate 110 and the second substrate 120 on which the seal 130 is formed on the other of the first substrate 110 and the second substrate 120 (step S16); curing the seal 130 and adhering the first substrate 110 and the second substrate 120 to each other (step S18); and adhering the first polarizing plate 140 to the first substrate 110 and adhering the second polarizing plate 150 to the second substrate 120 (step S20). The manufacturing method of the liquid crystal display device 10 further includes curving the first substrate 110 and the second substrate 120 that are adhered to each other in a first direction (the X direction) (step S22); and mounting the back light 300 (step S24).

In step S10, a glass substrate on which a TFT, a wiring, and the like are formed (a so-called TFT substrate) is prepared as the first substrate 110 in a flat state. Additionally, a glass substrate on which a color filter, a black matrix, and the like are formed (a so-called color filter substrate) is prepared as the second substrate 120 in a flat state.

In step S12, a dispenser is used to coat a UV curable resin on the first main surface 120a of the second substrate 120, thereby forming, in a frame shape, the seal 130 that seals the liquid crystal LC. Note that the UV curable resin includes a spacer.

In step S14, the liquid crystal LC is dropped in the region, of the first main surface 120a of the second substrate 120, surrounded by the seal 130. Then, in step S16, the second substrate 120 on which the liquid crystal LC is dropped and the first substrate 110 are stacked on each other in the flat state. In step S18, UV light is emitted on the seal 130 to adhere the first substrate 110 and the second substrate 120 to each other in the flat state. Furthermore, in step S20, the first polarizing plate 140 is adhered to the second main surface 110b of the first substrate 110, and the second polarizing plate 150 is adhered to the second main surface 120b of the second substrate 120. Thus, the liquid crystal display panel 100 in a flat state is fabricated.

In step S22, the first substrate 110 and the second substrate 120 that are adhered to each other are curved in the first direction (the X direction) as a result of the second polarizing plate 150 being adhered to the main surface 200a of the cover 200 via the adhesive layer 202. The main surface 200a of the cover 200 is molded into a curved surface that matches the curved display surface 102 of the liquid crystal display panel 100.

Here, when cross-sectionally viewing on an XZ cross-section, in the display region 104 surrounded by the seal 130, the curved surface 160 curves toward the +Z direction in the center section and curves toward the −Z direction at the +X side end and the −X side end (that is, has the two inflection points P1 and P2), and causes the first substrate 110 and the second substrate 120 to curve to a state in which the tangent planes 162a and 162b of the curved surface 160 at the inner peripheral ends 130a of the seal 130 are parallel to each other. As a result, the length L1 of the center line 112 of the thickness direction of the first substrate 110 and the length L2 of the center line 122 of the thickness direction of the second substrate 120 can be made equal. Since the length L1 of the center line 112 and the length L2 of the center line 122 are equal, it is possible to suppress the fluctuation of the spacing between the first substrate 110 and the second substrate 120 at the ends of the display region 104, and it is possible to suppress display inconsistencies.

In step S24, the back light 300 is mounted on the liquid crystal display panel 100 by adhering the ends of the cover 200 to the side walls 322 of the housing 320 of the back light 300 via the adhesive layer 302. Thus, the liquid crystal display device 10 can be manufactured.

As described above, when cross-sectionally viewing on an XZ cross-section, the curved surface 160 includes the two inflection points P1 and P2 in the display region 104, and the tangent planes 162a and 162b of the curved surface 160 at the inner peripheral ends 130a of the seal 130 are in a state parallel to each other. As a result, the length L1 of the center line 112 and the length L2 of the center line 122 are equal. Due to this, it is possible to suppress the fluctuation of the spacing between the first substrate 110 and the second substrate 120 at the ends of the display region 104, and it is possible to suppress display inconsistencies of the liquid crystal display panel 100 (the liquid crystal display device 10).

Embodiment 2

With the liquid crystal display panel 100 of Embodiment 1, the curved surface 160 has the two inflection points P1 and P2. However, it is sufficient that the curved surface 160 has at least one inflection point. Here, the curving of the liquid crystal display panel 100 of the present embodiment is described. The other configurations of the liquid crystal display panel 100 and the liquid crystal display device 10 of the present embodiment are the same as the configurations of Embodiment 1.

Figure 7:
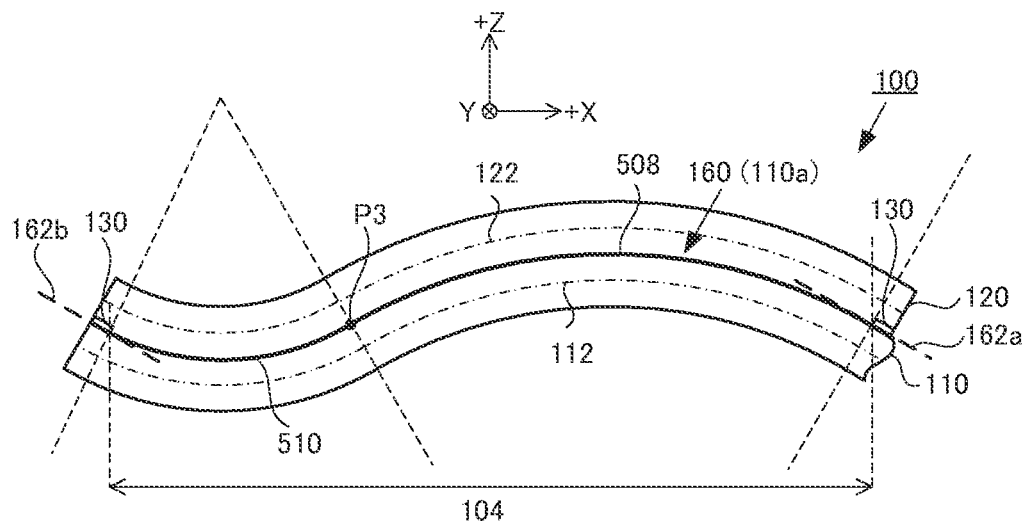
FIG. 7 is a schematic drawing for explaining curving of a liquid crystal display panel according to Embodiment 2.

As illustrated in FIG. 7, the liquid crystal display panel 100 (the first substrate 110 and the second substrate 120) of the present embodiment curves in the X direction. With the liquid crystal display panel 100 of the present embodiment, when cross-sectionally viewing on an XZ cross-section, the curved surface 160 curves toward the +Z direction at the +X side and curves toward the −Z direction at the −X side. One inflection point P3 is formed at the boundary between a curving surface (convex surface) 508 on the +X side and a curving surface (concave surface) 510 on the −X side that is continuous with the curving surface (convex surface) 508. Additionally, when cross-sectionally viewing on an XZ cross-section, the tangent planes 162a and 162b of the curved surface 160 at each of the inner peripheral ends 130a of the seal 130 are parallel to each other. Note that, in the present embodiment, the curvature radius of the curving surface 508 and the curvature radius of the curving surface 510 are different.

Due to this configuration, as described later, a length L1 of a center line 112 of the thickness direction of the first substrate 110 in the display region 104, and a length L2 of a center line 122 of the thickness direction of the second substrate 120 in the display region 104 are equal. As a result, as in Embodiment 1, the difference between the stresses applied to the first substrate 110 and the second substrate 120 is mitigated. Due to this, it is possible to suppress the fluctuation of the spacing between the first substrate 110 and the second substrate 120 at the ends of the display region 104, and it is possible to suppress display inconsistencies of the liquid crystal display panel 100 (the liquid crystal display device 10). Note that, to facilitate comprehension, the liquid crystal LC, the first polarizing plate 140, and the like are omitted, and the liquid crystal display panel 100 is illustrated in a simplified manner in FIG. 7. Additionally, in the present embodiment as well, the display surface 102 of the liquid crystal display panel 100 has the same shape as the curved surface 160.

Figure 8:
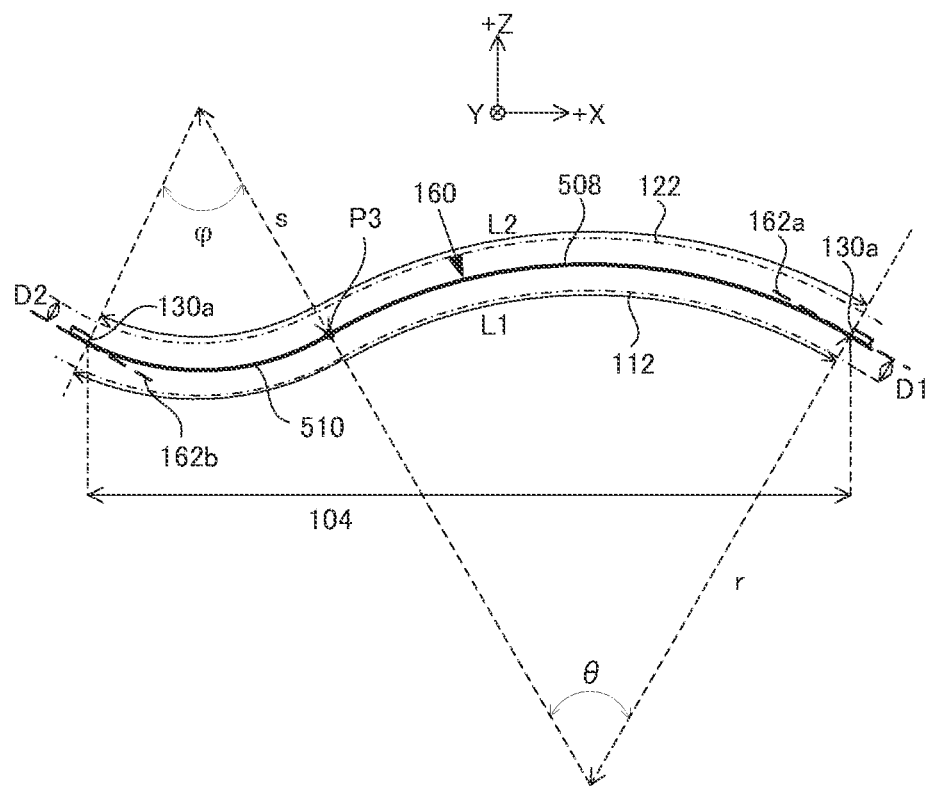
FIG. 8 is a schematic drawing for explaining a length of a center line of a thickness direction of a first substrate and a second substrate according to Embodiment 2.

Next, the length L1 of the center line 112 of the thickness direction of the first substrate 110, and the length L2 of the center line 122 of the thickness direction of the second substrate 120 are described. As illustrated in FIG. 8, when, in the curved surface 160, the curvature radius and the center angle of the curving surface 508 on the +X side are r and θ, the curvature radius and the center angle of the curving surface 510 on the −X side are s and φ, half the thickness of the first substrate 110 is D1, and half the thickness of the second substrate 120 is D2, the length L1 of the center line 112 and the length L2 of the center line 122 are expressed by equations (4) and (5) below. Additionally, based on equations (4) and (5), the difference between the length L1 of the center line 112 and the length L2 of the center line 122 is expressed by equation (6) below.

$$L1 = \frac{2 \times \pi}{360} \times ((r - D1) \times \theta + (s + D1) \times \varphi) \quad (4)$$

$$L2 = \frac{2 \times \pi}{360} \times ((r + D2) \times \theta + (s - D2) \times \varphi) \quad (5)$$

$$L1 - L2 = 2 \times \pi \times (D1 + D2) \times \frac{\varphi - \theta}{360} \quad (6)$$

When the tangent plane 162a of the curved surface 160 at the inner peripheral end 130a of the seal 130 positioned on the +X side and the tangent plane 162b of the curved surface 160 at the inner peripheral end 130a of the seal 130 positioned on the −X side are in a parallel state, θ=φ and, as such, according to equation (6), the length L1 of the center line 112 and the length L2 of the center line 122 are equal.

As described above, when cross-sectionally viewing on an XZ cross-section, the curved surface 160 includes the one inflection point P3 in the display region 104, and the tangent planes 162a and 162b of the curved surface 160 at the inner peripheral ends 130a of the seal 130 are in a parallel state. As a result, the length L1 of the center line 112 and the length L2 of the center line 122 are equal. Due to this, it is possible to suppress the fluctuation of the spacing between the first substrate 110 and the second substrate 120 at the ends of the display region 104, and it is possible to suppress display inconsistencies of the liquid crystal display panel 100 (the liquid crystal display device 10).

Embodiment 3

In Embodiment 2, the curved surface 160 is formed from a surface (convex surface) curved toward the +Z direction and a surface (concave surface) curved toward the −Z direction and continuous with the surface curved toward the +Z direction. However, a configuration is possible in which the curved surface 160 is formed from two surfaces curved toward the +Z direction that are continuous and have different curvature radii, and a surface curved toward the −Z direction. Here, the length L1 of the center line 112 of the thickness direction of the first substrate 110 and the length L2 of the center line 122 of the thickness direction of the second substrate 120 are described.

Figure 9:
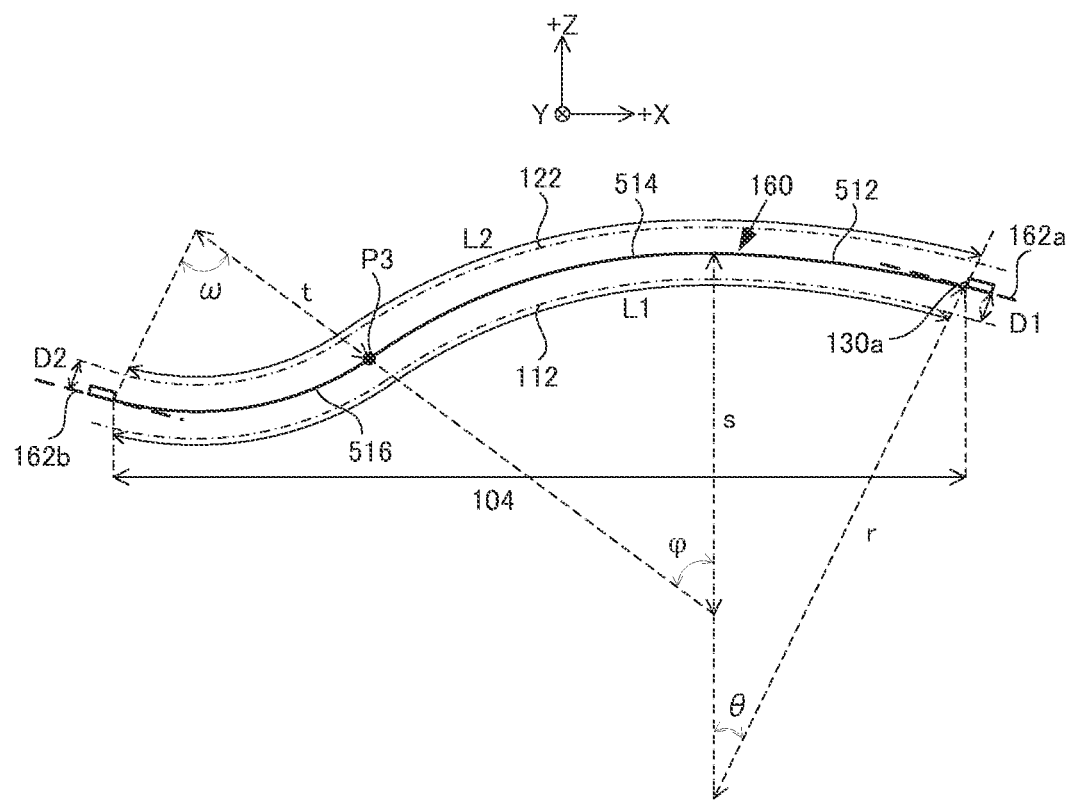
FIG. 9 is a schematic drawing for explaining a length of a center line of a thickness direction of a first substrate and a second substrate according to Embodiment 3.

When cross-sectionally viewing on an XZ cross-section, as illustrated in FIG. 9, the curved surface 160 of the present embodiment is formed from two surfaces (convex surfaces) 512 and 514 that are continuous, have different curvature radii, and are curved toward the +Z direction, and a surface (concave surface) 516 that is positioned on the −X side, is continuous with the surface 514 curved toward the +Z direction, and is curved toward the −Z direction. The one inflection point P3 is formed at the boundary between the surface 514 curved toward the +Z direction and the surface 516 curved toward the −Z direction. Additionally, when cross-sectionally viewing on an XZ cross-section, the tangent planes 162a and 162b of the curved surface 160 at each of the inner peripheral ends 130a of the seal 130 are parallel to each other. Note that, in the present embodiment as well, the display surface 102 of the liquid crystal display panel 100 has the same shape as the curved surface 160.

When, in the curved surface 160, the curvature radius and the center angle of the +X side surface 512 curved toward the +Z direction are r and θ, the curvature radius and the center angle of the −X side surface 514 curved toward the +Z direction are s and φ, the curvature radius and the center angle of the surface 516 curved toward the −Z direction are t and ω, half the thickness of the first substrate 110 is D1, and half the thickness of the second substrate 120 is D2, the length L1 of the center line 112 of the thickness direction of the first substrate 110 and the length L2 of the center line 122 of the thickness direction of the second substrate 120 are expressed by equations (7) and (8) below. Additionally, based on equations (7) and (8), the difference between the length L1 of the center line 112 and the length L2 of the center line 122 is expressed by equation (9) below.

$$L1 = \frac{2 \times \pi}{360} \times ((r - D1) \times \theta + (s - D1) \times \varphi + (t + D1) \times \omega) \quad (7)$$

$$L2 = \frac{2 \times \pi}{360} \times ((r + D2) \times \theta + (s + D2) \times \varphi + (t - D2) \times \omega) \quad (8)$$

$$L1 - L2 = 2 \times \pi \times (D1 + D2) \times \frac{\omega - \theta - \varphi}{360} \quad (9)$$

When the tangent plane 162a of the curved surface 160 at the inner peripheral end 130a of the seal 130 positioned on the +X side and the tangent plane 162b of the curved surface 160 at the inner peripheral end 130a of the seal 130 positioned on the −X side are in a parallel state, ω=θ+φ and, as such, according to equation (9), the length L1 of the center line 112 and the length L2 of the center line 122 are equal.

Thus, the length L1 of the center line 112 and the length L2 of the center line 122 can be made the same, even when the curved surface 160 is formed form the two surfaces 512 and 514 that are continuous, have different curvature radii, and are curved toward the +Z direction. Accordingly, it is possible to suppress the fluctuation of the spacing between the first substrate 110 and the second substrate 120 at the ends of the display region 104, and it is possible to suppress display inconsistencies of the liquid crystal display panel 100 (the liquid crystal display device 10).

Embodiment 4

In Embodiment 1, when cross-sectionally viewing the curved surface 160 on an XZ cross-section, the shape of the curved surface 160 is the same for every XZ cross-section. However, a configuration is possible in which the shape of the curved surface 160 (positions of the inflection points, heights of peaks, and the like) changes for every XZ cross-section (for example, along the Y direction). Here, the curving of the liquid crystal display panel 100 of the present embodiment is described. The other configurations of the liquid crystal display panel 100 and the liquid crystal display device 10 of the present embodiment are the same as the configurations of Embodiment 1.

Figure 10:
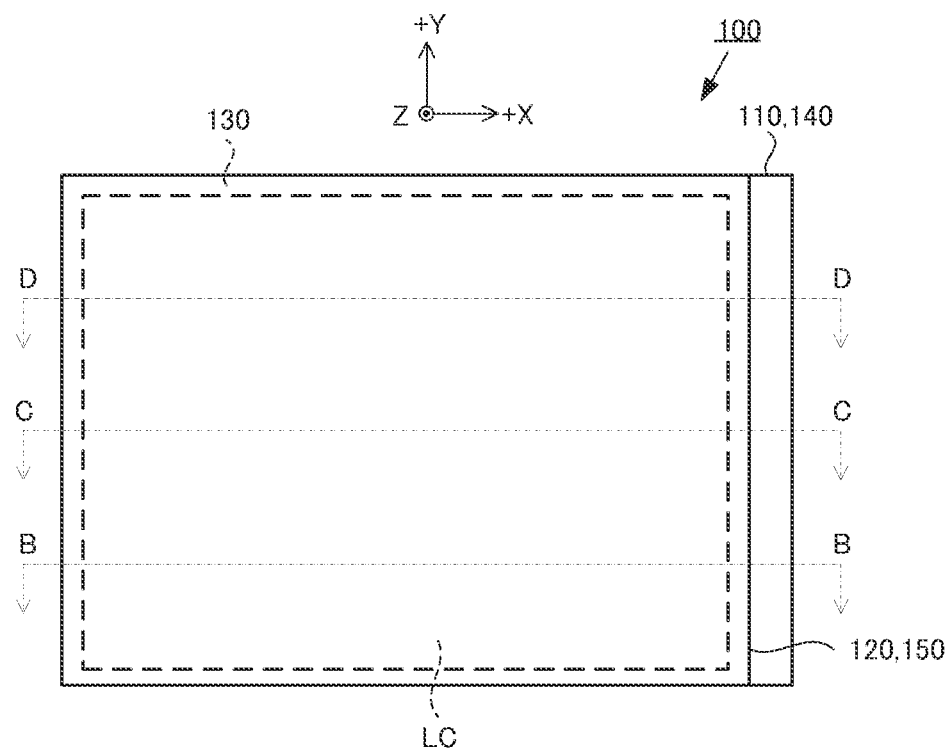
FIG. 10 is a plan view of a liquid crystal display panel according to Embodiment 4.
Figure 11:
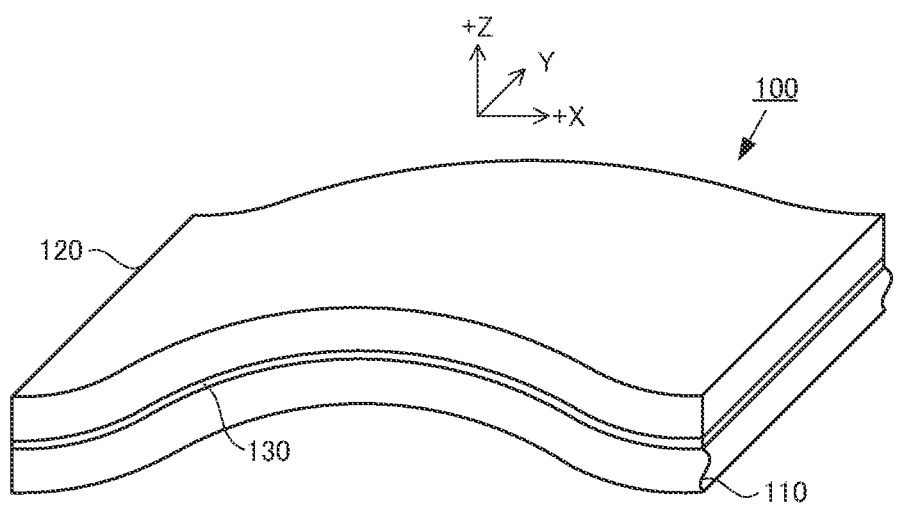
FIG. 11 is a perspective view of the liquid crystal display panel according to Embodiment 4.

As illustrated in FIG. 10, as with Embodiment 1, when viewed planarly, the liquid crystal display panel 100 (the first substrate 110 and the second substrate 120) of the present embodiment has a rectangular shape. Additionally, as with Embodiment 1, as illustrated in FIG. 11, the liquid crystal display panel 100 of the present embodiment curves in the X direction, curves toward the +Z direction in the center section, and curves toward the −Z direction at the +X side end and the −X side end. Furthermore, when cross-sectionally viewing on an XZ cross-section, the liquid crystal display panel 100 of the present embodiment has line symmetry with respect to the Z direction. Note that, to facilitate comprehension, the liquid crystal LC, the first polarizing plate 140, and the like are omitted, and the liquid crystal display panel 100 is illustrated in a simplified manner in FIG. 11. The liquid crystal display panel 100 is sometimes illustrated in a simplified manner in the following drawings as well.

As in Embodiment 1, when cross-sectionally viewing on an XZ cross-section, the curved surface 160 (curved surfaces 160a to 160c, described later) curves toward the +Z direction in the center section, curves toward the −Z direction at the +X-side end and the −X-side end, and has line symmetry with respect to the Z direction. Furthermore, as in Embodiment 1, the tangent plane 162a of the curved surface 160 at the inner peripheral end 130a of the seal 130 positioned on the +X side and the tangent plane 162b of the curved surface 160 at the inner peripheral end 130a of the seal 130 positioned on the −X side are parallel to each other. The tangent planes 162a and 162b are parallel to the XY plane.

Figure 12:
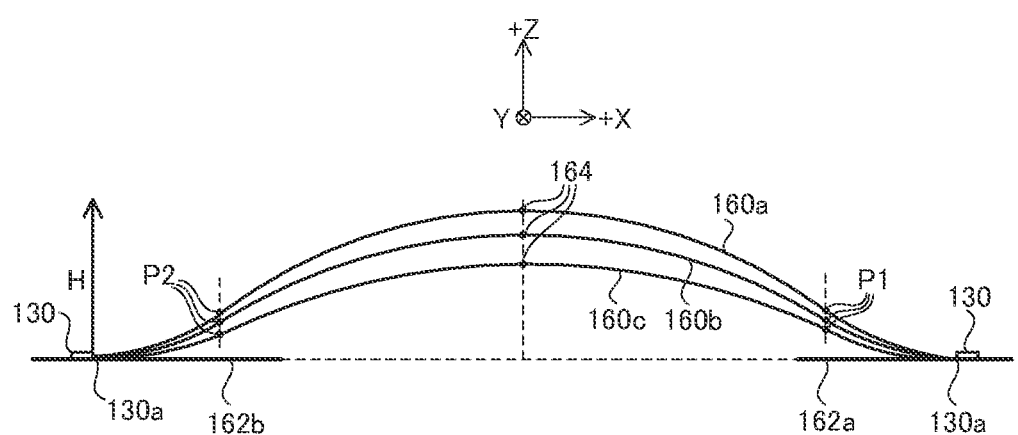
FIG. 12 is a schematic drawing illustrating a curved surface according to Embodiment 4.

In the present embodiment, a height H from the tangent planes 162a and 162b of the peak 164 of the curved surface 160 differs for every XZ cross-section. For example, as illustrated in FIG. 12, the height H of the peak 164 decreases in order of a curved surface 160a in an XZ cross-section taken along line B-B of FIG. 10, a curved surface 160b in an XZ cross-section taken along line C-C of FIG. 10, and a curved surface 160c in an XZ cross-section taken along line D-D of FIG. 10. That is, the liquid crystal display panel 100 of the present embodiment is curved such that the height H of the peak 164 of the curved surface 160 decreases along the Y direction. Note that, in the present embodiment as well, the display surface 102 of the liquid crystal display panel 100 has the same shape as the curved surface 160.

Thus, a configuration is possible in which the height H from the tangent planes 162a and 162b of the peak 164 of the curved surface 160 is different for every XZ cross-section. Additionally, in the present embodiment as well, when cross-sectionally viewing on an XZ cross-section, the curved surface 160 (the curved surfaces 160a to 160c) includes the two inflection points P1 and P2 in the display region 104, and the tangent planes 162a and 162b of the curved surface 160 at the inner peripheral ends 130a of the seal 130 are in a parallel state. As a result, the length L1 of the center line 112 and the length L2 of the center line 122 can be made equal. Accordingly, it is possible to suppress the fluctuation of the spacing between the first substrate 110 and the second substrate 120 at the ends of the display region 104, and it is possible to suppress display inconsistencies of the liquid crystal display panel 100 (the liquid crystal display device 10). Furthermore, since the shape of the curved surface 160 (the display surface 102) changes every XZ cross-section, the design of the liquid crystal display panel 100 and the liquid crystal display device 10 can be enhanced.

Embodiment 5

In Embodiment 4, the height H from the tangent planes 162a and 162b of the peak 164 of the curved surface 160 differs for every XZ cross-section. A configuration is possible in which the positions of the inner peripheral ends 130a of the seal 130 differ for every XZ cross-section.

Figure 13:
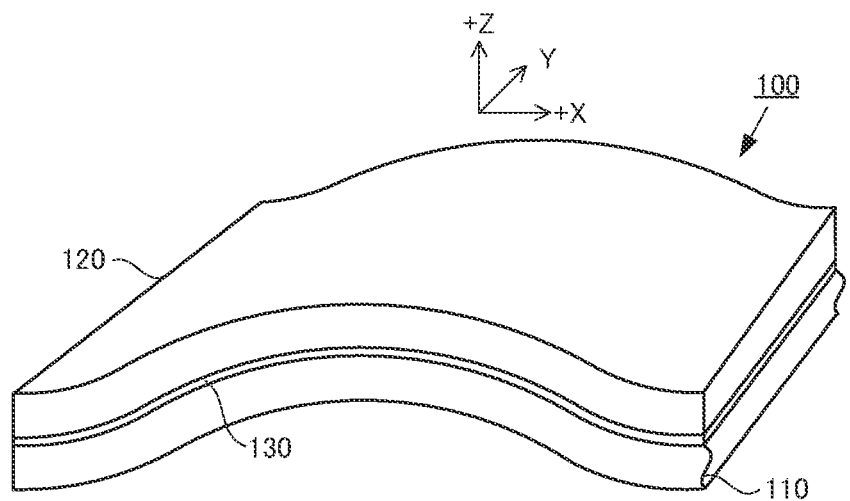
FIG. 13 is a perspective view of a liquid crystal display panel according to Embodiment 5.

As with Embodiment 1, as illustrated in FIG. 13, the liquid crystal display panel 100 (the first substrate 110 and the second substrate 120) of the present embodiment curves in the X direction, curves toward the +Z direction in the center section, and curves toward the −Z direction at the +X side end and the −X side end. Furthermore, when cross-sectionally viewing on an XZ cross-section, the liquid crystal display panel 100 of the present embodiment has line symmetry with respect to the Z direction.

As in Embodiment 1, when cross-sectionally viewing on an XZ cross-section, the curved surface 160 (curved surfaces 160d to 160f, described later) curves toward the +Z direction in the center section, curves toward the −Z direction at the +X-side end and the −X-side end, and has line symmetry with respect to the Z direction. Furthermore, as in Embodiment 1, the tangent plane 162a of the curved surface 160 at the inner peripheral end 130a of the seal 130 positioned on the +X side and the tangent plane 162b of the curved surface 160 at the inner peripheral end 130a of the seal 130 positioned on the −X side are parallel to each other. The tangent planes 162a and 162b are parallel to the XY plane.

Figure 14:
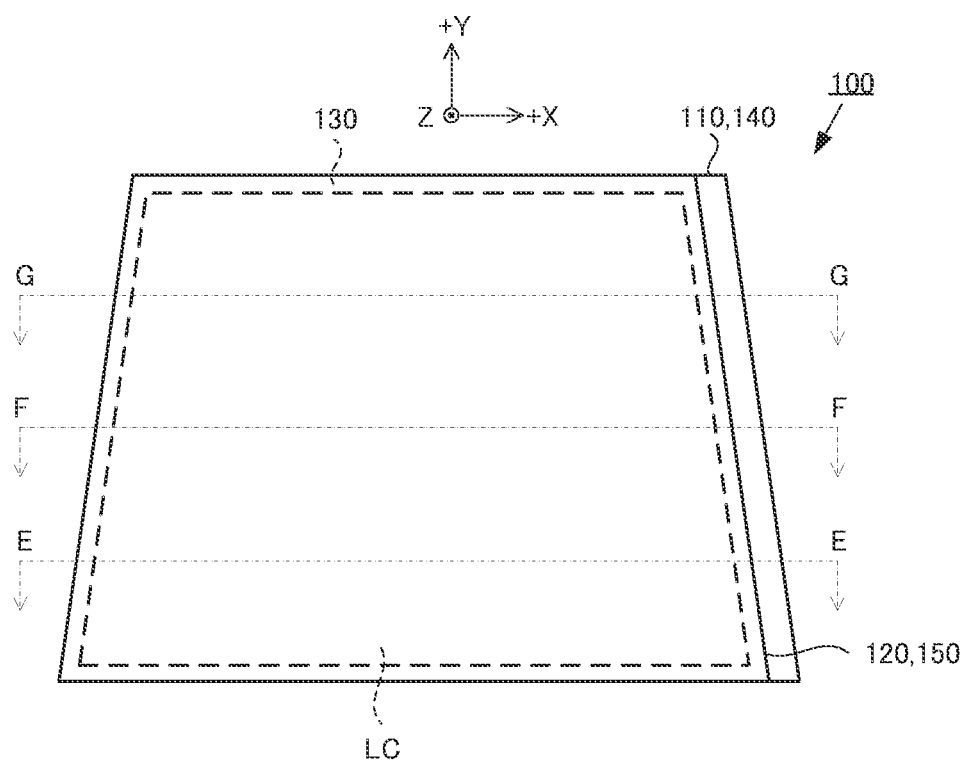
FIG. 14 is a plan view of the liquid crystal display panel according to Embodiment 5.
Figure 15:
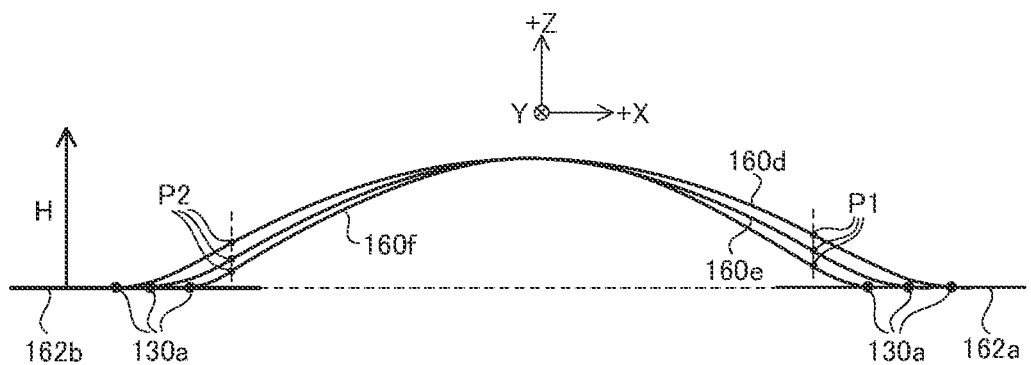
FIG. 15 is a schematic drawing illustrating a curved surface according to Embodiment 5.

Meanwhile, when viewed planarly, as illustrated in FIG. 14, the liquid crystal display panel 100 of the present embodiment has a trapezoid shape in which the +Y side is narrow. The seal 130 of the present embodiment is formed along the external shapes of the first substrate 110 and the second substrate 120, and the spacing of the seal 130 narrows toward the +Y direction. Accordingly, as illustrated in FIG. 15, for a curved surface 160d in an XZ cross-section taken along line E-E of FIG. 14, a curved surface 160e in an XZ cross-section taken along line F-F of FIG. 14, and a curved surface 160f in an XZ cross-section taken along line G-G of FIG. 14, the positions of the inner peripheral ends 130a of the seal 130 differ for every XZ cross-section.

Thus, a configuration is possible in which the positions of the inner peripheral ends 130a of the seal 130 differ for every XZ cross-section. In the present embodiment as well, when cross-sectionally viewing on an XZ cross-section, the curved surface 160 (the curved surfaces 160d to 160f) includes the two inflection points P1 and P2 in the display region 104, and the tangent planes 162a and 162b of the curved surface 160 at the inner peripheral ends 130a of the seal 130 are in a parallel state. Accordingly, it is possible to make the length L1 of the center line 112 and the length L2 of the center line 122 equal, and it is possible to suppress display inconsistencies of the liquid crystal display panel 100 (the liquid crystal display device 10). Furthermore, since the shape of the curved surface 160 (the display surface 102) changes for every XZ cross-section, the design of the liquid crystal display panel 100 and the liquid crystal display device 10 can be enhanced.

Embodiment 6

In Embodiment 1, the liquid crystal display panel 100 is adhered to the cover 200 and is supported in the curved state. However, a configuration is possible in which the liquid crystal display panel 100 is supported in the curved state by the cover 200 and the back light 300.

Figure 16:
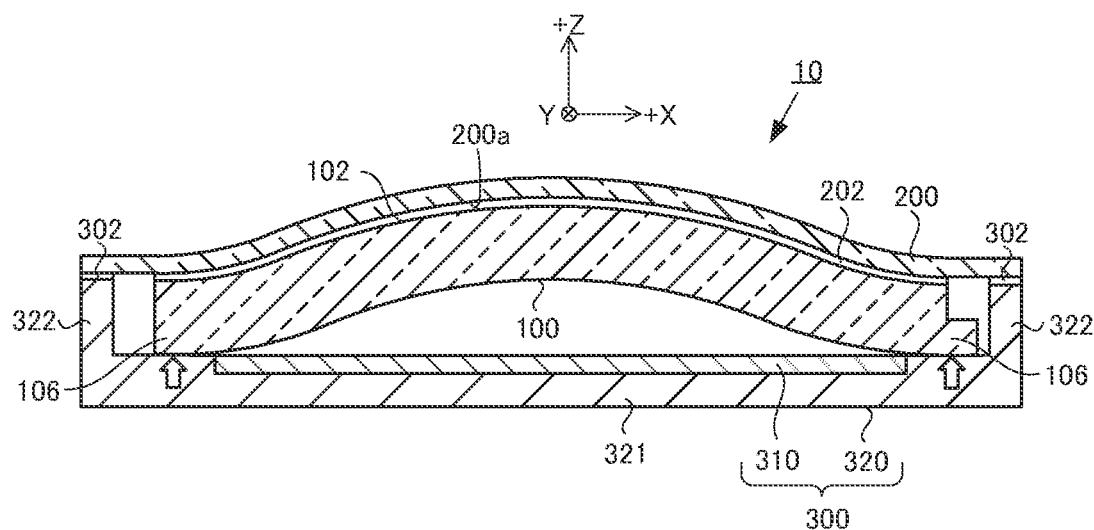
FIG. 16 is a schematic drawing illustrating a cross-section of a liquid crystal display device according to Embodiment 6.

As in Embodiment 1, in the present embodiment, the ends of the cover 200, to which the liquid crystal display panel 100 are adhered, are adhered to the side walls 322 of the housing 320 of the back light 300. In the present embodiment, as illustrated in FIG. 16, the liquid crystal display panel 100 is supported in the curved state by an end 106 being sandwiched between the cover 200 and the bottom plate 321 of the housing 320 of the back light 300. Due to this configuration, the liquid crystal display panel 100 can be more stably supported.

Modified Examples

Embodiments have been described, but various modifications can be made to the present disclosure without departing from the spirit and scope of the present disclosure.

For example, a configuration is possible in which the stripe-like color filter, the black matrix, the alignment film, and the like are formed on the first main surface 110a of the first substrate 110, and the TFT, the wirings, the electrodes, the alignment film, and the like are formed on the first main surface 120a of the second substrate 120.

Figure 17:
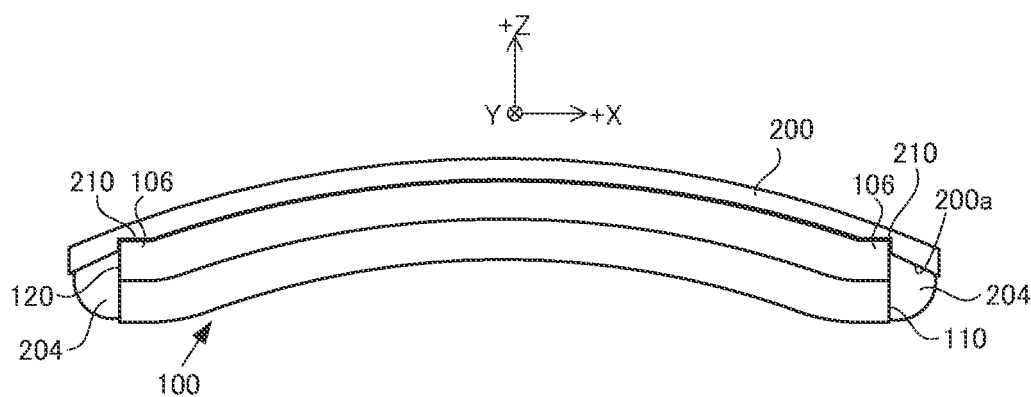
FIG. 17 is a schematic drawing illustrating a cover according to a modified example.

As illustrated in FIG. 17, a configuration is possible in which the cover 200 includes, on the main surface 200a, grooves 210 that accommodate the ends 106 of the liquid crystal display panel 100. Due to this configuration, interference between the ends 106 of the liquid crystal display panel 100 and the main surface 200a of the cover 200 can be prevented. Additionally, the surface of the display side of the cover 200 can be molded into a free curving surface, and the design of the liquid crystal display device 10 can be enhanced. Note that, to facilitate comprehension, the adhesive layer 202, the second polarizing plate 150, and the like are omitted from FIG. 16.

Figure 18:
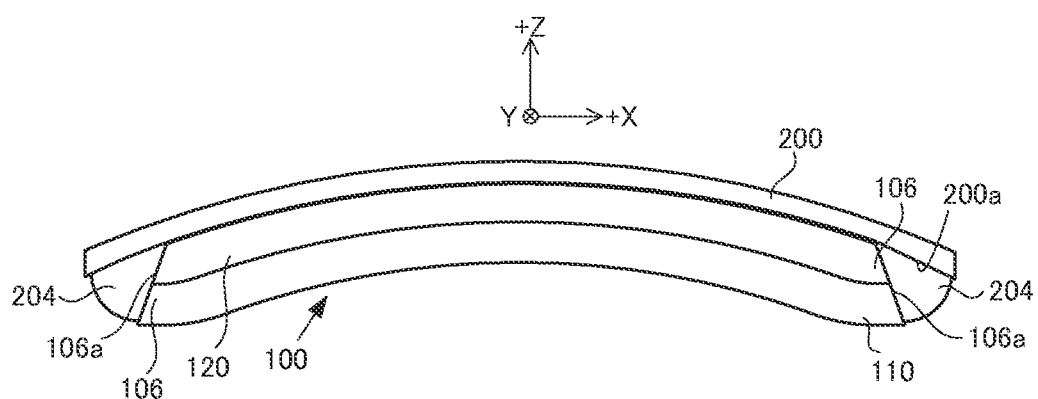
FIG. 18 is a schematic drawing illustrating a liquid crystal display panel according to a modified example.
Figure 19:
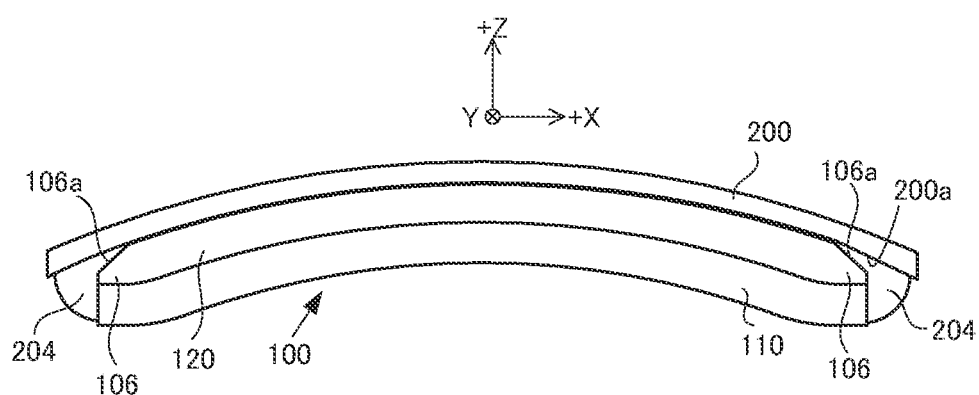
FIG. 19 is a schematic drawing illustrating a liquid crystal display panel according to a modified example.

As illustrated in FIGS. 18 and 19, a configuration is possible in which the liquid crystal display panel 100 includes a chamfer 106a on the ends 106. Due to this configuration, interference between the ends 106 of the liquid crystal display panel 100 and the main surface 200a of the cover 200 can be prevented. Additionally, the surface of the display side of the cover 200 can be molded into a free curved surface, and the design of the liquid crystal display device 10 can be enhanced. When the chamfer 106a is provided on only the second substrate 120 as illustrated in FIG. 18, cracking and chipping of the first substrate 110 can be prevented.

As illustrated in FIGS. 17 to 19, a configuration is possible in which the liquid crystal display panel 100 and the cover 200 are adhered by an adhesive layer 204 that adheres the ends 106 of the liquid crystal display panel 100 to the main surface 200a of the cover 200. The adhesive layer 204 may be a photocurable adhesive or a thermosetting adhesive. Due to the adhesive layer 204 broadly covering the ends 106 of the liquid crystal display panel 100, the curved liquid crystal display panel 100 can be even more stably supported. Configurations in which the adhesive layer 204 adheres to and supports the ends 106 of the liquid crystal display panel 100 are not limited hereto. For example, a configuration is possible in which the chamfer 106a and the adhesive layer 204 are provided on only one end 106 of the liquid crystal display panel 100.

A configuration is possible in which, for example, instead of the adhesive layer 204, in Embodiment 6 (FIG. 16), the bottom plate 321 of the housing 320 of the back light 300 is molded in a shape conforming to the ends 106 of the liquid crystal display panel 100 and, as a result, the ends 106 of the liquid crystal display panel 100 are supported by the housing 320 of the back light 300.

Figure 20:
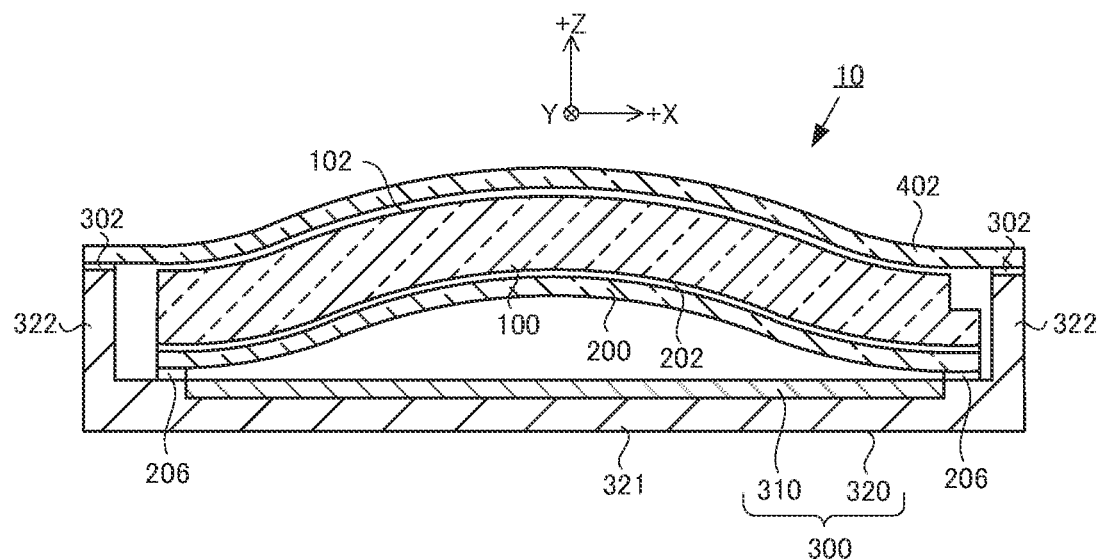
FIG. 20 is a schematic drawing illustrating a liquid crystal display device according to a modified example.

As illustrated in FIG. 20, a configuration is possible in which the cover 200 is provided on the side of the liquid crystal display panel 100 opposite the display surface 102. The cover 200 provided on the side opposite the display surface 102 supports the liquid crystal display panel 100 in the curved state. In such a case, a protective cover 402 made from light-transmitting resin is provided on the display surface 102 side of the liquid crystal display panel 100. In one example, the protective cover 402 is adhered to the housing 320 of the back light 300 by the adhesive layer 302. Additionally, in one example, the cover 200 is adhered to the bottom plate 321 of the housing 320 of the back light 300 by an adhesive layer 206. Note that the hatching of the adhesive layers 202, 302, and the like is omitted from FIG. 20.

Figure 21:
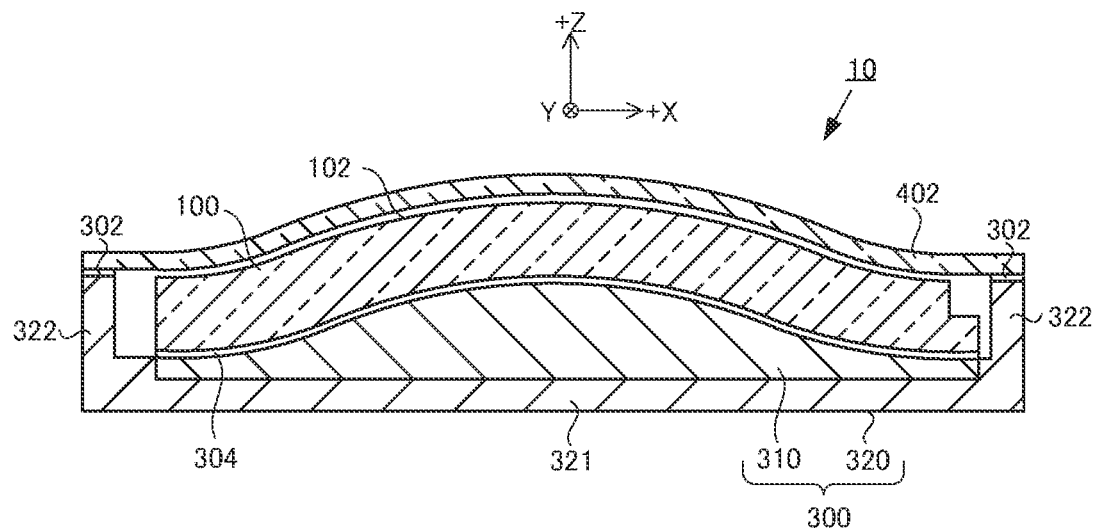
FIG. 21 is a schematic drawing illustrating a liquid crystal display device according to a modified example.

As illustrated in FIG. 21, a configuration is possible in which the liquid crystal display panel 100 is supported in the curved state by the light source 310 of the back light 300 via an adhesive layer 304. In such a case, the light source 310 is molded in a shape that matches the curving of the liquid crystal display panel 100.

Figure 22:
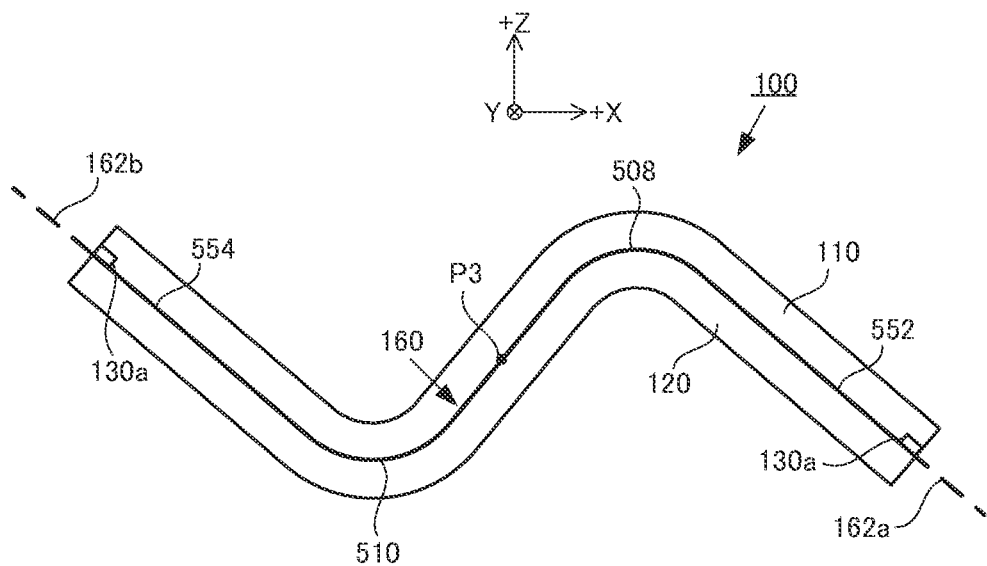
FIG. 22 is a schematic drawing illustrating a liquid crystal display panel according to a modified example.

In Embodiment 2, the curvature radius r of the curving surface 508 of the curved surface 160 and the curvature radius s of the curving surface 510 of the curved surface 160 are different, but a configuration is possible in which the curvature radius r of the curving surface 508 and the curvature radius s of the curving surface 510 are the same. Moreover, a configuration is possible in which the curved surface 160 includes a flat surface. For example, as illustrated in FIG. 22, the curved surface 160 may include a first flat surface 552 continuous with the curving surface 508 that is a convex surface, and a second flat surface 554 continuous with the curving surface 510 that is a concave surface. In such a case, the curved surface 160 is flat at the inner peripheral ends 130a of the seal 130 and, as such, the curved surface 160 corresponds to the tangent planes 162a and 162b of the curved surface 160 at each of the inner peripheral ends 130a of the seal 130.

Figure 23:
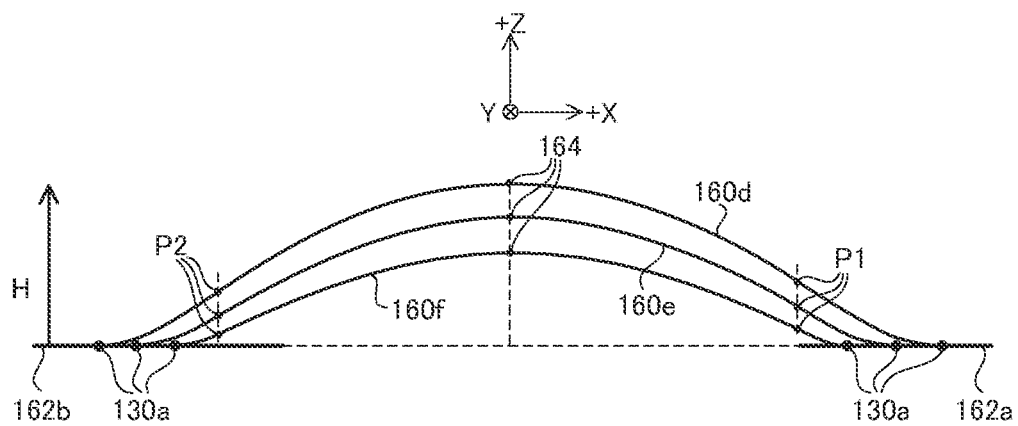
FIG. 23 is a schematic drawing illustrating a curved surface according to a modified example.
Figure 24:
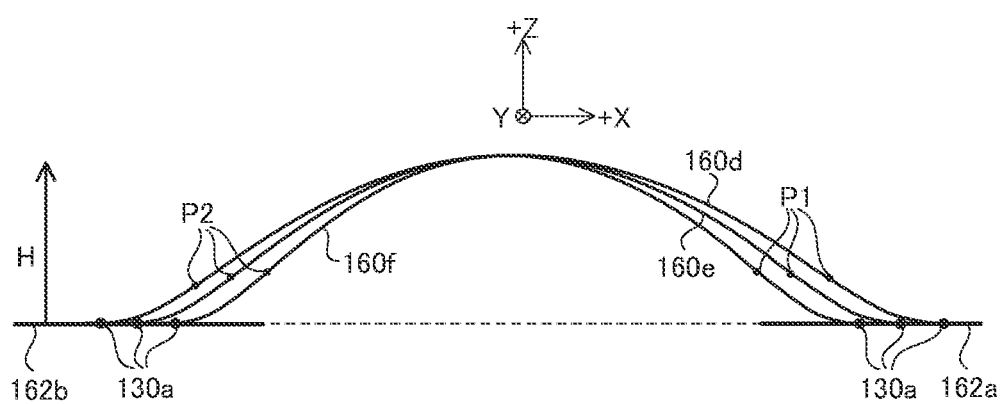
FIG. 24 is a schematic drawing illustrating a curved surface according to a modified example.

In Embodiment 5, the positions of the inner peripheral ends 130a of the seal 130 are different for every XZ cross-section. However, a configuration is possible in which at least one of the height H from the tangent planes 162a and 162b of the peak 164 of the curved surface 160, the positions of the inner peripheral ends 130a of the seal 130, and the positions of the inflection points P1 and P2 are different for every XZ cross-section. For example, as illustrated in FIG. 23, a configuration is possible in which the height H from the tangent planes 162a and 162b of the peak 164 of the curved surface 160, and the positions of the inner peripheral ends 130a of the seal 130 are different for every XZ cross-section. Additionally, as illustrated in FIG. 24, a configuration is possible in which the positions of the inflection points P1 and P2, and the positions of the inner peripheral ends 130a of the seal 130 are different for every XZ cross-section.

Figure 25:
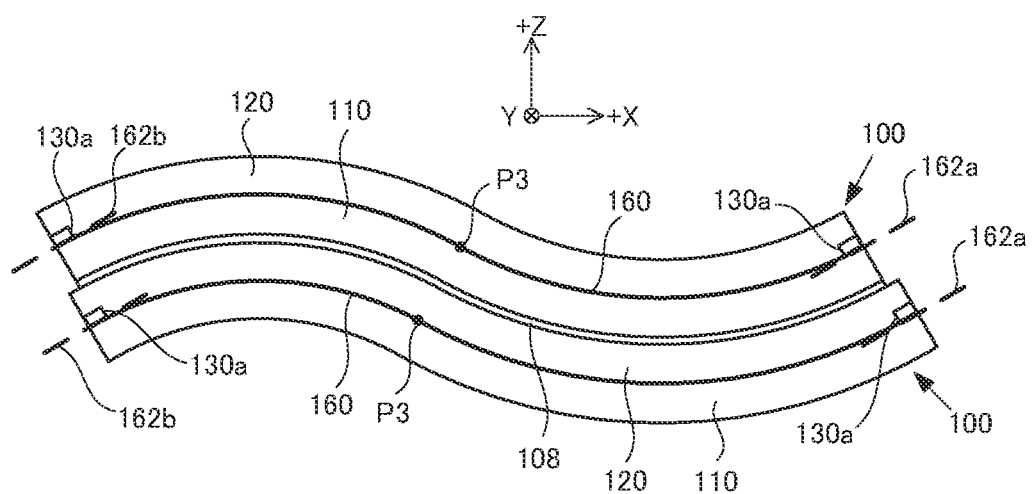
FIG. 25 is a schematic drawing illustrating a liquid crystal display panel according to a modified example.

A configuration is possible in which the liquid crystal display device 10 includes two liquid crystal display panels 100. As illustrated in FIG. 25, the two liquid crystal display panels 100 are adhered to each other by an adhesive layer 108. In one example, of the two liquid crystal display panels 100, the liquid crystal display panel 100 positioned on the display side (the +Z side) displays a color image, and the liquid crystal display panel 100 positioned on the side opposite the display side (the −Z side) displays a monochrome image.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A liquid crystal display panel, comprising:
   a first substrate curved in a first direction;
   a second substrate curved in the first direction and facing the first substrate;
   a liquid crystal sandwiched between the first substrate and the second substrate; and
   a seal that adheres the first substrate and the second substrate to each other, and that seals the liquid crystal, wherein
   when cross-sectionally viewing on a cross-section including the first direction and a display direction,
   a curved surface provided in a display region surrounded by inner peripheral ends of the seal, and conforming to a first main surface of the first substrate facing the second substrate includes at least one inflection point, and tangent planes of the curved surface at each inner peripheral end of the seal are parallel to each other,
   the curved surface includes at least one convex surface and at least one concave surface continuous with the at least one convex surface, the at least one convex surface having a curvature radius different than a curvature radius of the at least one concave surface,
   a sum of at least one center angle of the at least one convex surface is equal to a sum of at least one center angle of the at least one concave surface, and
   a length of a center line of a thickness direction of the first substrate and a length of a center line of a thickness direction of the second substrate are equal in the display region.

2. The liquid crystal display panel according to claim 1, wherein when cross-sectionally viewing on the cross-section, the curved surface includes, in the region surrounded by the seal, a first flat surface continuous with the at least one convex surface, and a second flat surface continuous with the at least one concave surface.

3. The liquid crystal display panel according to claim 1, wherein at least one of a height from the tangent plane of a peak of the curved surface, a position of the inner peripheral end of the seal, or a position of the inflection point is different for every cross-section arranged along a direction perpendicular to the first direction and the display direction.

4. A liquid crystal display device, comprising:
   the liquid crystal display panel according to claim 1; and
   a cover that is provided on a display surface of the liquid crystal display panel or a surface of a side opposite the display surface of the liquid crystal display panel, and that supports the liquid crystal display panel in a curved state via an adhesive layer.

5. The liquid crystal display device according to claim 4, wherein the cover includes, on a surface facing the liquid crystal display panel, a groove that accommodates an end of the liquid crystal display panel.

6. The liquid crystal display device according to claim 4, wherein an end of the liquid crystal display panel includes a chamfer.

7. The liquid crystal display device according to claim 4, wherein at least one of the ends of the liquid crystal display panel is fixed to the cover by an adhesive.

8. The liquid crystal display device according to claim 4, comprising:
   two of the liquid crystal display panel that are stacked.

9. The liquid crystal display device according to claim 4, further comprising:
   a back light that emits light at the liquid crystal display panel, wherein
   the cover and the back light sandwich the liquid crystal display panel to support the liquid crystal display panel in the curved state.

10. A manufacturing method for a liquid crystal display device, the manufacturing method comprising:
    forming, on one of a first substrate and a second substrate, a seal that seals a liquid crystal;
    stacking one of the first substrate and the second substrate on which the seal is formed on another of the first substrate and the second substrate;
    curing the seal and adhering the first substrate and the second substrate to each other; and
    curving the first substrate and the second substrate that are adhered to each other in a first direction such that a length of a center line of a thickness direction of the first substrate and a length of a center line of a thickness direction of the second substrate are equal in a display region surrounded by inner peripheral ends of the seal, wherein
    in the curving, the first substrate and the second substrate are caused to curve to a state in which, when cross-sectionally viewing on a cross-section including the first direction and a display direction, a curved surface provided in the display region and conforming to a first main surface of the first substrate facing the second substrate includes at least one inflection point in a region surrounded by the seal, and tangent planes of the curved surface at each inner peripheral end of the seal are parallel to each other, and the curved surface includes at least one convex surface and at least one concave surface continuous with the at least one convex surface, the at least one convex surface having a curvature radius different than a curvature radius of the at least one concave surface, and a sum of a center angle of the at least one convex surface is equal to a sum of a center angle of the at least one concave surface.

* * * * *